United States Patent Office 2,900,211
Patented Aug. 18, 1959

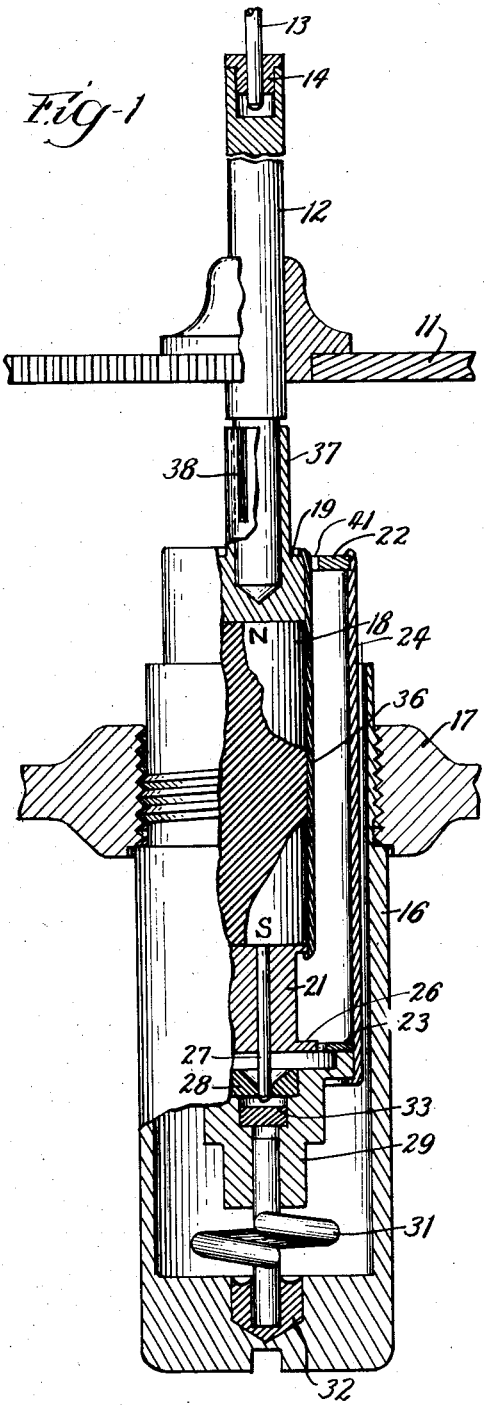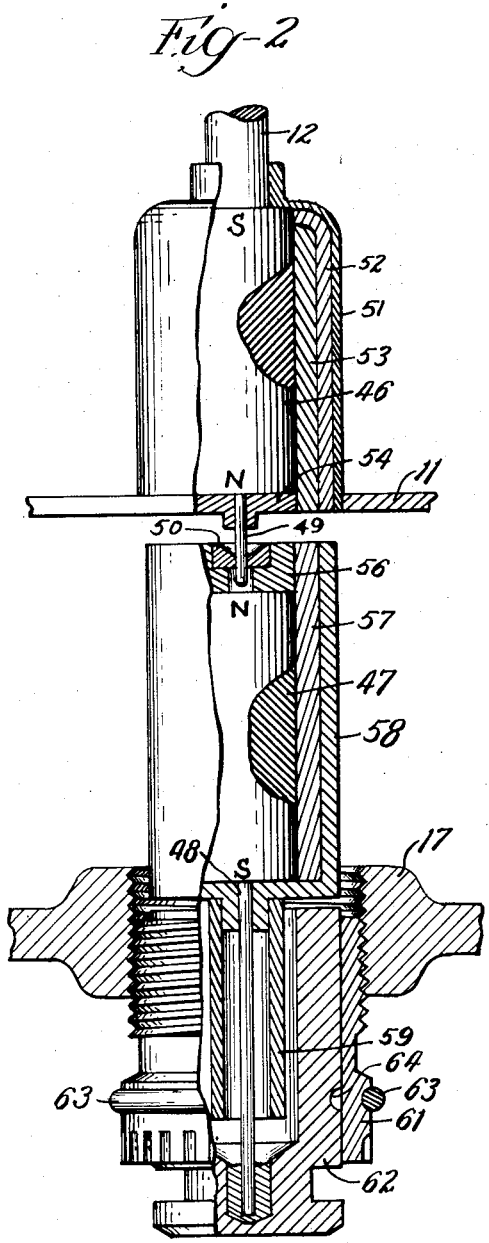

2,900,211

MAGNETIC SUSPENSION WITH FLEXIBILITY

Stanley S. Green, Indianapolis, Ind., assignor, by mesne assignments, to Duncan Electric Company, Inc., a corporation of Indiana Application July 6, 1954, Serial No. 441,433

12 Claims. (Cl. 308—10)

This invention relates especially to "magnetic bearings" for rotating disks of watthour meters—of which the ordinary home electricity meter is an example. By "magnetic bearing" is meant a mounting system in which most or all of the weight of the rotating disk is supported magnetically, so that there is little or no bearing load and hence little or no friction and wear. Of course, the invention may have uses in other fields.

There has already been considerable effort toward the development of "magnetic bearings." The rotating disks of watthour meters have proved through many years to be exceptionally alluring to thoughts of such magnetic suspension. Many magnetic suspensions for such disks have been proposed, some have been tried, and a few have met with some commercial success. The present invention is believed to be quite advantageous as compared with those of the past.

One of the faults of the more practical forms of the magnetic suspensions of the past has been magnetic side-thrust upon displacement of the rotary member from its normal axis. Such magnetic side-thrust is objectionable because it tends to cause further decentering of the rotary element and thus places an objectionable load on structural side bearings (ring bearings) which must be provided to resist such side thrust. The varying magnetic fields which result from the alternating current which drives the meter disk tend to produce a lateral vibration or cyclical movement of the disk shaft. There has long been recognition in the industry that objectionable hum as a result of this vibration is reduced by accommodating this lateral vibration rather than trying to stop it. Magnetic suspensions have accommodated the vibration by using systems which permitted the rotary element to vibrate laterally with respect to the stationary pole from which it derives support.

iWth the types of magnetic support which readily provide total vertical suspension of the rotating element, this lateral vibration or oscillation would, without this invention, have a very undesirable effect. This follows from the fact that magnetic suspensions of these types are inherently subject to magnetic side thrust whenever the rotary element is off-center, and of course a rotary element which is oscillating laterally is necessarily off-center most of the time. Furthermore, these types of bearings are inherently subject to the same defect of magnetic side thrust whenever decentering results from other causes.

Although another type of magnetic suspension, using axially aligned poles attracting one another, is not subject to this defect, it in turn is less readily suitable for the desirable total vertical suspension.

According to the present invention, the magnetic poles, between which lies the magnetic force supporting the rotary element, are provided with lateral guide bearings having a snug-running bearing fit so as to hold the magnetic poles well centered with respect to one another. The necessary accommodation of vibration is provided by a resilient mounting between the set of aligned poles and the holding structure for one of them.

The foregoing feature permits the mounting of the magnetic suspension at the lower bearing of the meter, when desired, even though the decentering forces there are commonly much stronger than at the upper bearing. Providing the magnetic suspension at the lower bearing is preferred by some designers, for various reasons. Space requirements of surrounding parts sometimes permit better accessibility at the lower position. Also, it permits continued use of the standard upper bearing which is inexpensive and virtually trouble free. Furthermore, it can be adapted for complete interchangeability of parts, so that in a given meter a magnetic bearing can be substituted for a jewel bearing, or vice versa, with great ease.

The preferred forms of the present invention have several excellent characteristics, aside from those mentioned. A very important feature is that they are low in cost, very compact, highly immune to externally derived magnetic fields, such as might be due to electrical surges or to exterior magnets. Rustproof resisting materials may be used throughout. The magnetic units can be installed easily and inspected readily in service. They need to have no critically close manufacturing tolerances, and in the preferred forms may use a single small magnet of readily available material and simple shape.

A highly desirable feature of the present invention is that it makes practicable interchangeability between magnetic bearing units and conventional type jewel bearing units. This is important because of the fact that manufacturers of meters must supply a wide variety of purchasers, most of whom are of a character to be insistent on certain features of construction. It follows that some will want jewel bearings while others will want magnetic bearings. Interchangeability is highly desirable from the manufacturer's standpoint. It is also desirable because a given purchaser buying meters with jewel bearing units this year may in some future year want magnetic bearing units and interchangeability will be highly desirable from his standpoint.

Additional objects and advantages of the invention will be apparent from the following description and from the drawings.

*Designation of figures*

Fig. 1 is a fragmentary view, partly broken away to show a partial section, illustrating a preferred form of the invention.

Fig. 2 is a similar view, illustrating a modified form of the invention.

*General description*

Although the law requires a full and exact description of at least one form of the invention, such as that which follows, it is, of course, one purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

In the form of the invention chosen for illustration in Fig. 1, a meter disk 11 is carried by a shaft 12, which is guided at its upper end by a conventional resilient pin 13 and bearing bushing 14, and at its lower end is supported and guided by the bearing of the present invention. The bearing of the present invention is contained within a bearing holder 16, which screws into a bracket 17 forming part of the meter frame. Magnetic support is obtained by magnetism derived from a permanent magnet 18 of simple cylindrical shape, the poles of which may be in contact with soft iron pole pieces 19 and 21, which are respectively surrounded by soft iron rings 22 and 23 magnetically connected together by a soft iron tube 24. These rings 22 and 23 present inwardly facing annular pole faces. The lower pole piece 21 is provided with a relatively enlarged outwardly radially facing annular pole 26. The poles 23 and 26 attract one another and tend to hold themselves aligned as seen in Fig. 1, their radially exposed faces obviously being annular pole faces. The poles 19 and 22 likewise attract one another by flux passing through their radially exposed faces which are annular pole faces and strongly resist the settling of pole 19 below the position shown in which the upper surface of the enlarged portion of pole 19 is even with the upper surface of pole 22.

The lower end of shaft 12 is guided by bearing pin 27, having a snug running fit in stationary (non-rotating) bearing element or bushing 28 of graphite or the like, so that poles 19 and 26 are normally held well centered within poles 22 and 23. Bushing 28 is rigid with stationary or non-rotating poles 22 and 23, being held in mounting 29 which is carried by one end of a spring 31, the other of which is secured by a body of solder 32 in a bearing holder 16. A flat surface 33, which may be formed on a graphite insert held by bearing block 29 is spaced slightly below the pin 27, so as to limit the possible downward displacement of the disk from its intended position. In normal operation, the pin 27 will remain out of contact with the surface 33.

Further details

The pole piece 19, magnet 18 and pole piece 21, in which is firmly secured the pin 27, tend to be held as one unit magnetically but are also firmly secured together by a sleeve 36 which is preferably formed of highly conductive, non-magnetic material. This assembly is held on the bottom of the meter shaft 12 by an extension 37 of the pole piece 19, which is provided with a series of slots 38, perhaps 4 in number, and resiliently engages the lower portion of shaft 12. By simply slipping this assembly from the shaft 12, a jewel type of bearing mount may be applied to the shaft 12 in its place, though the substitution is more likely to be a magnetic unit for a jewel unit. When the bearing holder 16 is similarly replaced by a jewel-type bearing holder and a conventional ball bearing in its jewel cup, the disk 11 is then provided with a conventional ball bearing mounting.

Although the pin 27 may be of the same resilient material as the pin 13, its free length is so short that there is substantially no flexing of it to permit pole 26 to be displaced from its centered position within the pole 23 so as to produce magnetic side-thrust. The spring 31, on the other hand, has sufficient length coiled within its single turn, to provide substantial flexibility of the mounting of mount 29, so that this mount can move about laterally to accommodate the vibration of the disk 11.

Advantageous magnetic side-thrust

If the forces causing rotation and retardation of a disk combine to exert a side thrust on it, they will flex the spring 31. This flexing will cause a slight tilting of the outer magnetic assembly, of which tube 24 is a major part. However, the lateral shifting of shaft 12, which produces the tilting of tube 24, will not be accompanied by a like tilting of shaft 12. For approximate considerations, it may be assumed that shaft 12 will remain vertical. Accordingly, the gap between pole piece 19 and magnetic ring or pole 22 will become non-uniform. Surprisingly, this is not a disadvantage but an advantage. Let us assume that the shaft 12 moves to the left. It will thereby tilt tube 24 to the left, as spring 31 flexes. The narrowest part of the gap 41 will therefore be on the right-hand side of pole 19. Accordingly, there will be stronger attraction on this side between poles 19 and 22, which will tend to pull the pole 19 to the right. This pull toward the right will relieve somewhat the thrust of pin 27 toward the left on bushing 28, this leftward thrust having been the force which produced the tilting of tube 24. Non-magnetic tube 36 extends through gap 41 to prevent the poles from coming too close to one another. It may be observed that gap 41 would have this advantageous side-thrust without the lower gap, as would any axial gap substantially beyond the bearing from the center of the tilt which side-pressure on the bearing produces.

Shielding

There is multiple shielding of the permanent magnet 18. Because of its conductive character, tube 36 is an effective shield against steep-front surges, such as are most likely to result from natural phenomena such as lightning. The soft iron tube 24 effectively by-passes around magnet 18 any stray magnetic fields, whether from natural causes or otherwise. The holder 16 is formed of conductive metal and therefore provides one additional shield against sudden surges.

It should be made clear that in referring to certain parts as "soft iron," this is merely a term used for convenience to indicate a magnetic material of fairly high permeability but substantially no permanence. In fact, the parts in question may be formed of a mild steel rather than iron alone.

Repulsion form

In Fig. 2 has been illustrated a form of the invention using repulsion between two like poles. In the illustrated form, the shaft 12 carried a permanent magnet 46 at its lower end, which is repelled by a permanent magnet 47, carried by a resilient pin 48. Here again the magnets are maintained well centered by a pin 49, too short for effective resiliency, and running with a snug-running fit in graphite bearing bushing 50.

In this instance, the necessity for having one of the magnets above the disk 11 tends to prevent providing interchangeability between the magnetic bearing and the conventional bearing. Instead, both the magnet 46 and the disk 11 may be carried by a cup 51 mounted on the bottom of shaft 12, which in this instance terminates slightly above disk 11, namely at the top of magnet 46. A soft iron shield 52 extends from the upper end of magnet 46 to the base of the assembly. A shield 53 of copper tubing is also preferably provided. Pin 49 may be carried by a pole piece 54 in contact with the lower face of magnet 46.

In like manner, bearing bushing 50 may be carried by a pole piece 56 at the upper end of magnet 47. A copper tubing sleeve 57 may surround the magnet 47 and in turn be surrounded by a soft iron shield 58, which may be in contact with magnet 47 at its lower end. The shields 52 and 58 form opposed poles at their facing ends and improve the repelling action between the magnets. Without the shields 52 and 58, repelling magnets tend to have a "soft" action. They tend to support the required load while the gap length is long enough so that a given slight downward movement of the rotary element would produce only very slight additional upward thrust. The shields 52 and 58 provide a different shape of magnetic field which overcomes this fault to a large extent.

A tube 59 is preferably provided as an extension of sleeve 58 to serve for limiting both the lateral and twisting movements of the lower magnetic assembly.

With repulsion types of magnets, it is difficult to predetermine in ordinary production the exact spacing above the magnet 47 at which the suspended element such as a meter disk will float. Accordingly, it is highly desirable to provide means of vertical adjustment of the stationary magnet to suspend the disk at the right elevation. In the illustrated form of the invention, this is provided by an adjuster sleeve 61 which is screwed into boss 17 on the lower frame. The lower magnet assembly is carried by a holder 62 which slides snugly into adjusting sleeve 61 and is secured in a predetermined position with respect to the sleeve 61 by a spring 63 having a loop in it which projects through a slot in the sleeve 61 and into a groove 64 in the holder 62.

The substantially rigid pin 49 keeps the respective magnets 46 and 47 accurately centered with respect to one another or aligned, so that magnetic side thrust is avoided. Nevertheless, the spring pin 48 permits the entire lower assembly to move enough to accommodate the vibration of the disk 11.

Nickel-iron magnetic alloys

It is preferred that the parts which have been designated as soft iron, and especially the various poles, be formed of magnetic metal having exceptionally high permeability and low hysteresis co-efficients, and which preferably is also virtually rustproof. The metal known as "Permalloy" is an example of these metals and others can be chosen from a handbook for electrical engineers. For example, in the 1941 edition of the Standard Handbook for Electrical Engineers, article 363, section 4, lists metals which are suitable, and article 334, section 4, would aid in choosing some having lower values for the hysteresis co-efficient. The low hysteresis co-efficient is more desirable for the pole pieces than for the tube 24. This is because hysteresis caused by rotation would develop chiefly in the pole pieces under conditions of minute lack of symmetry, magnetically speaking. As a matter of fact, it is most important of all that the rotating pole be of the metal having a low hysteresis co-efficient because it is probably most subject to the hysteresis effects upon rotation. Thus, if the forces of rotation and retardation applied to the disk draw it somewhat off-center while it is rotating, the more concentrated flux between this pole and the surrounding stationary pole at the narrowest part of the gap between them will remain at one point while the movable pole rotates with respect to it, so that this concentrated flux will be constantly shifting relatively around the rotating pole. Hence the flux through the rotating pole will be most concentrated first in one direction or portion and then in another, this being the hysteresis phenomenon. To guard against the hysteresis phenomenon and its retardation effect due to magnetic dissymmetry other than the lateral displacement, all of the poles should be of the material of low hysteresis co-efficient, and perhaps all of the magnetic circuit other than the permanent magnet. The metal chosen to reduce hysteresis effects should have a hysteresis co-efficient at least as low as approximately .0005 (corresponding to the best grade of silicon steel) and preferably as low as approximately .0001 (corresponding to the best nickel steel alloys, such as "Permalloy"). "Permalloy" is 60% to 90% nickel and the remainder essentially iron.

Further data

The reluctance of the two gaps in Fig. 1, which are in series, should preferably be made approximately the same in designing a particular suspension. It is for this reason that the ring pole 22 has been shown thicker than the ring pole 23, which has been shown with a smaller gap. The gaps at present contemplated are .024" for the upper gap 41, and .017" for the lower gap. The upper gap is made larger because it is subject to more variation or lateral displacement in use. The shorter gap is desirable when centering is sufficiently reliable, because it will produce a given required lift with less vertical displacement of the two poles forming the gap and hence is not as "soft" in action. Also, there is less variation in this vertical displacement due to minute differences of magnetic strength between successive magnetic suspensions in an assembly line. It is partly for this reason that it is believed unnecessary to provide means for vertical adjustment in the Fig. 1 form of the invention. Efforts should be made to substantially eliminate variations by subjecting all magnets to a knockdown process, bringing them to the same strength.

As seen in the drawings, the face of lower pole 26 is of smaller diameter than the face of pole 22. This permits insertion of one part within the other. With advantages of compactness and simplicity, the peripheral face of the pole piece 19 is of the same diameter as magnet 18.

The length of the upper gap 41 can be chosen to provide a given amount of bearing-relieving pull upon lateral displacement. In fact, it could (possibly with other changes) cause the lateral bearing load to pass through zero at some stage of displacement within or near the maximum commonly encountered.

The permanent magnets are preferably formed of cast Alnico V, and have plain square-cut ends (i.e., perpendicular to their length) which adapt them to formation from cast rods by a normal cutoff process. The rods or magnets may be centerless ground. Alnico VI or almost any other high coercive magnetic material may be used, depending largely upon cost and space considerations.

The compositions of Alnico V and Alnico VI are by weight substantially as follows:

|  | Alnico V | Alnico VI |
|---|---|---|
| Aluminum | 8 | 8 |
| Nickel | 14 | 16 |
| Cobalt | 24 | 24 |
| Copper | 3 | 3 |
| Titanium | 0 | 3 |
| Iron | 51 | 46 |

The bearing pins 27 and 49 are preferably of stainless steel pressed into place respectively in pole pieces 21 and 54. Springs 31 and 48 and also bearing spring 13 may be formed of phosphor bronze or beryllium copper.

Clearance of about .005" is at present preferred beneath the ends of bearing pins 27 and 49, although this may be as small as may be practical to provide without ordinarily having contact during operation of the meter.

Upper pole piece 19 should have a snug fit with the lower end of shaft 12, so that it will function virtually as an extension of the shaft.

The drawings have been shown at approximately four times contemplated size, and it is believed that in the printed patent they will still appear to be about 2.4 times the actual contemplated size. Thus the drawings do not do justice to the amazing compactness, which will permit use of the Fig. 1 form with bearing holders of the same size that has long been used for conventional types of bearings, though a slightly larger one may be preferred since space is available.

I claim:

1. A magnetic suspension for an element rotatable on a substantially vertical axis including a rotary assembly rotatable approximately about its axis, and a stationary assembly; one assembly including a cylindrical permanent magnet and poles at opposite ends thereof having outwardly radially facing annular pole faces each terminated abruptly at an edge forming the boundary of the face in one vertical direction; the other assembly having annular poles each with a face facing radially inward opposite one of the first-named faces and abruptly terminating at an edge forming the boundary of the face in the opposite vertical direction, and a tube of magnetic material in contact with both of said annular poles to complete a circuit from the magnet through one pair of poles causing them to attract one another, through the tube and through the other pair of poles causing them to attract one another, back to the magnet.

2. A magnetic suspension for an element rotatable on a substantially vertical axis including a rotary assembly rotatable approximately about its axis, and a stationary assembly; one assembly including a cylindrical permanent magnet and poles at opposite ends thereof having outwardly radially facing annular pole faces each terminated abruptly at an edge forming the boundary of the face in one vertical direction; the other assembly having annular poles each with a face facing radially inward opposite one of the first-named faces and abruptly terminating at an edge forming the boundary of the face in the opposite vertical direction, and a tube of magnetic material in contact with both of said annular poles to complete a circuit from the magnet through one pair of poles causing them to attract one another, through the tube and through the other pair of poles causing them to attract one another, back to the magnet; one of the outwardly facing pole faces being of substantially the same diameter as the magnet, and the annular pole opposite it being of larger internal diameter than the diameter of the other outwardly facing pole.

3. A magnetic suspension for an element rotatable on a substantially vertical axis including a rotary assembly rotatable approximately about its axis, and a stationary assembly; one assembly including a cylindrical permanent magnet and poles at opposite ends thereof having radially facing annular pole faces each terminated abruptly at an edge forming the boundary of the face in one vertical direction; the other assembly having annular poles each with a face facing radially inward opposite one of the first-named faces and abruptly terminating at an edge forming the boundary of the face in the opposite vertical direction, and a tube of magnetic material in contact with both of said annular poles to complete a circuit from the magnet through one pair of poles causing them to attract one another, through the tube and through the other pair of poles causing them to attract one another, back to the magnet, and a tube of non-magnetic material of high conductivity within said tube of magnetic material, securing the first-named poles to the magnet, and covering the full length of the magnet.

4. A magnetic suspension for an element rotatable on a substantially vertical axis including a rotary assembly rotatable approximately about its axis, and a stationary assembly; one assembly including a cylindrical permanent magnet and poles at opposite ends thereof having radially facing annular pole faces each terminated abruptly at an edge forming the boundary of the face in one vertical direction; the other assembly having annular poles each with a face facing radially inward opposite one of the first-named faces and abruptly terminating at an edge forming the boundary of the face in the opposite vertical direction, and a tube of magnetic material in contact with both of said annular poles to complete a circuit from the magnet through one pair of poles causing them to attract one another, through the tube and through the other pair of poles causing them to attract one another, back to the magnet, and a tubular holder carrying one of said assemblies internally and threaded externally.

5. A magnetic suspension for a rotary element including a permanent magnet, suspension poles energized by the magnet, one of said poles being carried by the rotary element and the other being stationary, guide bearing means for maintaining the poles co-axially disposed with respect to one another, including a rotary bearing element carried by the rotary element, and a stationary bearing element; one bearing element and the pole associated with it being in rigid relation to one another and jointly supported resiliently to accommodate vibratory movement of the rotary element.

6. A magnetic suspension for a rotary element including a permanent magnet, suspension poles energized by the magnet, one of said poles being carried by the rotary element and the other being stationary, guide bearing means for maintaining the poles co-axially disposed with respect to one another, including a rotary bearing element carried by the rotary element, and a stationary bearing element; the stationary bearing element and the stationary pole being in rigid relation to one another and jointly supported resiliently to accommodate vibratory movements of the rotary element.

7. A magnetic suspension for a rotary element including a permanent magnet, suspension poles energized by the magnet, one of said poles being carried by the rotary element and the other being stationary, guide bearing means for maintaining the poles co-axially disposed with respect to one another except when relative tilting occurs between the stationary and rotating parts, including a rotary bearing element carried by the rotary element, and a stationary bearing element; the stationary bearing element and the stationary pole being in rigid relation to one another and jointly supported resiliently to accommodate vibratory movements of the rotary element.

8. A magnetic suspension for a rotary element including a permanent magnet, suspension poles energized by the magnet, one of said poles being carried by the rotary element and the other being stationary, guide bearing means for maintaining the poles co-axially disposed with respect to one another except when relative tilting occurs between the stationary and rotating parts, including a rotary bearing element carried by the rotary element, and a stationary bearing element; the stationary bearing element and the stationary pole being in rigid relation to one another and jointly supported resiliently to accommodate vibratory movements of the rotary element, the resilient support being subject to tilting of the resiliently supported parts in response to radial bearing pressure, and said poles being beyond the point of bearing pressure from the point about which the tilt occurs to cause the poles to approach one another as a result of the tilt on the side of the axis opposite the bearing pressure which produces the tilt.

9. A magnetic suspension for a rotary element including a permanent magnet, first and second axially spaced pairs of suspension poles energized by the magnet, one pole of each pair being carried by the rotary element and the other being stationary, guide bearing means for maintaining the poles of the first pair co-axially disposed with respect to one another, including a rotary bearing element carried by the rotary element, and a stationary bearing element; the stationary bearing element and the stationary poles being in rigid relation to one another and jointly supported resiliently to accommodate vibratory movements of the rotary element, the first pair being axially closer to the zone of engagement of the bearing elements than the second pair and the resilient support being subject to tilting of the resiliently supported parts in response to radial bearing pressure to cause the second pair to approach one another on the side of the axis opposite to the application of the radial bearing pressure.

10. A magnetic suspension for a rotary element in accordance with claim 8, in which a magnetic metal having a low hysteresis co-efficient is used for at least the rotating pole which becomes eccentric with respect to its corresponding stationary pole, the hysteresis co-efficient of said metal being at least as low as approximately .0005.

11. A magnetic suspension for an element rotatable on a substantially vertical axis including a pair of poles forming a gap, one of the poles being secured to the rotary element and the other of the poles being stationarily mounted, and magnet means associated with the poles for magnetizing said poles oppositely to attract one another for suspension of the rotary element, both of said poles being formed of a magnetic material having a hysteresis co-efficient at least as low as approximately .0001, whereby any resistance to rotation caused by the hysteresis resulting from lack of complete uniformity of the poles will be extremely small.

12. A magnetic suspension for an element rotatable on a substantially vertical axis, including a rotary assembly rotatable approximately about its axis and a stationary assembly, the rotary assembly including a cylindrical permanent magnet and poles at opposite ends thereof having annular pole faces facing radially outward, each terminating abruptly along an upper edge of the face, the stationary assembly having annular poles each with a face facing radially inward opposite one of the first named faces and abruptly terminating along a lower edge of the face, and a tube of magnetic material in contact with both of said annular poles to complete a circuit from the magnet through one pair of poles causing them to attract one another, through the tube and through the other pair of poles causing them to attract one another, back to the magnet.

References Cited in the file of this patent

UNITED STATES PATENTS

| | | | |
|---|---|---|---|
| 588,666 | Stanley et al. | Aug. 24, | 1897 |
| 2,311,382 | Hansen | Feb. 16, | 1943 |
| 2,333,647 | Green | Nov. 9, | 1943 |
| 2,411,684 | Hamilton et al. | Nov. 26, | 1946 |
| 2,436,939 | Schug | Mar. 2, | 1948 |
| 2,585,714 | Wrobel et al. | Feb. 12, | 1952 |
| 2,651,550 | Sharp | Sept. 8, | 1953 |